(12) United States Patent
Moon et al.

(10) Patent No.: US 10,658,933 B2
(45) Date of Patent: *May 19, 2020

(54) SHORT-CIRCUIT PROTECTION USING PULSE WIDTH MODULATION (PWM) FOR RESONANT CONVERTERS

(71) Applicant: FAIRCHILD KOREA SEMICONDUCTOR LTD., Buehcon (KR)

(72) Inventors: Sangcheol Moon, Bucheon (KR); Jintae Kim, Sungnam-si (KR); Hangseok Choi, Suwon (KR)

(73) Assignee: Semiconductor Components Industries, LLC, Phoenix, AZ (US)

( * ) Notice: Subject to any disclaimer, the term of this patent is extended or adjusted under 35 U.S.C. 154(b) by 335 days.

This patent is subject to a terminal disclaimer.

(21) Appl. No.: 15/668,980

(22) Filed: Aug. 4, 2017

(65) Prior Publication Data

US 2018/0054130 A1 Feb. 22, 2018

Related U.S. Application Data

(60) Provisional application No. 62/377,063, filed on Aug. 19, 2016.

(51) Int. Cl.
*H02H 1/00* (2006.01)
*H02M 3/335* (2006.01)
(Continued)

(52) U.S. Cl.
CPC ...... *H02M 3/33515* (2013.01); *H02H 1/0007* (2013.01); *H02M 1/08* (2013.01); *H02M 1/083* (2013.01); *H02M 1/32* (2013.01); *H02M 1/36* (2013.01); *H02M 3/33523* (2013.01); *H02M 3/33546* (2013.01); *H02M 2001/0009* (2013.01); *Y02B 70/1433* (2013.01); *Y02B 70/1491* (2013.01); *Y02B 70/16* (2013.01)

(58) Field of Classification Search
None
See application file for complete search history.

(56) References Cited

U.S. PATENT DOCUMENTS 5,973,943 A 10/1999 Ribarich et al.
6,256,210 B1 7/2001 Strijker et al.
(Continued)

OTHER PUBLICATIONS

Keeping, Steven, Digi-Key Electronics, "A Review of Zero-Voltage Switching and its Importance to Voltage Regulation," May 7, 2017.
(Continued)

*Primary Examiner* — Stephen W Jackson
(74) *Attorney, Agent, or Firm* — Brake Hughes Bellermann LLP

(57) ABSTRACT

According to an implementation, a resonant converter for short-circuit protection includes an oscillator, a short-circuit detector configured to detect a short-circuit condition in a component of the resonant converter, and a pulse width modulation (PWM) controller configured to control the oscillator in a PWM mode before short-circuit protection is triggered. The oscillator, when in the PWM mode, is configured to generate a first clock signal for driving a first power switch and a second clock signal for driving a second power switch.

20 Claims, 7 Drawing Sheets

(51) Int. Cl.
*H02M 1/36* (2007.01)
*H02M 1/32* (2007.01)
*H02M 1/08* (2006.01)
*H02M 1/00* (2006.01)

(56) References Cited

U.S. PATENT DOCUMENTS

| | | | |
|---|---|---|---|
| 6,331,755 | B1 | 12/2001 | Ribarich et al. |
| 6,496,387 | B2 | 12/2002 | Halberstadt |
| 6,879,115 | B2 | 4/2005 | Ribarich |
| 7,116,561 | B2 | 10/2006 | Osaka |
| 7,323,825 | B2 | 1/2008 | Hwang et al. |
| 7,750,615 | B2 | 7/2010 | Jung et al. |
| 8,014,176 | B2 | 9/2011 | Melanson et al. |
| 8,665,621 | B2 * | 3/2014 | Tsai .............. H02H 9/023 323/271 |
| 8,737,101 | B2 | 5/2014 | Cho et al. |
| 9,203,318 | B2 | 12/2015 | Scibilia |
| 9,647,528 | B2 | 5/2017 | Lee et al. |
| 2009/0244934 | A1 | 10/2009 | Wang et al. |
| 2010/0202170 | A1 | 8/2010 | Kim et al. |
| 2012/0307530 | A1 | 12/2012 | Miyazaki |
| 2015/0003117 | A1 | 1/2015 | Ferrazza et al. |
| 2015/0229220 | A1 | 8/2015 | Lee et al. |
| 2018/0054134 | A1 | 2/2018 | Moon et al. |

OTHER PUBLICATIONS

Abdel-Rahman, Sam, Infineon Technologies North America (IFNA) Corp., "Resonant LLC Converter: Operation and Design," V1.0 Sep. 2012.
STMicroelectronics, "AN2644 Application Note, An Introduction to LLC Resonant Half-Bridge Converter," Sep. 2008.
STMicroelectronics, "L6699 Enhanced High Voltage Resonant Controller," Jan. 2013.
Fairchild Semiconductor, now part of ON Semiconductor, "FAN7631 Advanced Pulse Frequency Modulation (PFM) Controller for Half-Bridge Resonant Converters," Apr. 2012.
STMicroelectronics, "L6699 Enhanced High-Voltage Resonant Controller," 2017.
ON Semiconductor, "NCP1399: Current Mode Resonant Controller with Integrated High Voltate Drivers, High Performance," My 21, 2017.
ON Semiconductor, "NPC1399 Series High Performance Current Mode Resonant Controller with Integrated High-Voltage Drivers," Jan. 2017.
Fairchild Semiconductor, now part of ON Semiconductor, "AN-6104 LLC Resonant Converter Design Using FAN7688," Sep. 16, 2015.
STMicroelectronics, "STCMB1 TM PFC with X-Cap Discharge and LLC Resonant Combo Controller," 2017.
Shenzhen Ming Feng Wei Electronics Co., Ltd., "Supply TEA1916T NXP NXP Synchronous Rectifier Controller," May 7, 2017.

* cited by examiner

SHORT-CIRCUIT PROTECTION USING PULSE WIDTH MODULATION (PWM) FOR RESONANT CONVERTERS

RELATED APPLICATIONS

This application claims priority to and the benefit of, under 35 U.S.C. § 119, U.S. Provisional Patent Application No. 62/377,063, filed Aug. 19, 2016, which is hereby incorporated by reference in its entirety.

This application is related to U.S. patent application Ser. No. 15/668,974, filed on Aug. 4, 2017, U.S. patent application Ser. No. 15/668,975, filed on Aug. 4, 2017, and U.S. patent application Ser. No. 15/668,983, filed on Aug. 4, 2017, each of which is incorporated by reference in its entirety.

TECHNICAL FIELD

This description relates to improving operations of resonant converters.

BACKGROUND

A resonant converter may convert an input voltage to an output voltage. A short-circuit condition may occur on a component in the resonant converter during switching operations. The short-circuit condition may induce relatively large primary side currents and higher output voltages in an undesirable fashion.

SUMMARY

According to an implementation, a resonant converter for short-circuit protection includes an oscillator, a short-circuit detector configured to detect a short-circuit condition in a component of the resonant converter, and a pulse width modulation (PWM) controller configured to control the oscillator in a PWM mode before short-circuit protection is triggered. The oscillator, when in the PWM mode, is configured to generate a first clock signal for driving a first power switch and a second clock signal for driving a second power switch.

The details of one or more implementations are set forth in the accompanying drawings and the description below. Other features will be apparent from the description and drawings, and from the claims.

DETAILED DESCRIPTION

Figure 1A:
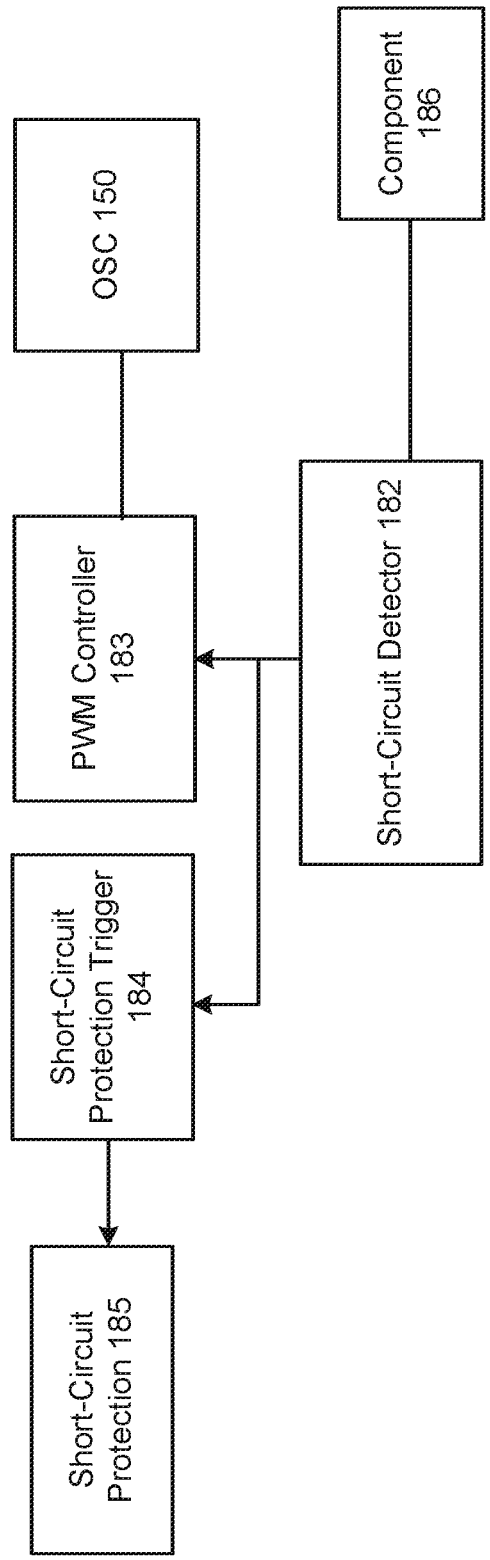
FIG. 1A illustrates a resonant converter for short-circuit protection using pulse width modulation (PWM) according to an implementation.

FIG. 1A illustrates a resonant converter 100 for short-circuit protection using pulse width modulation (PWM) according to an implementation. In some examples, the resonant converter 100 may be an electric power converter that includes a network of one or more inductors and one or more capacitors, which are tuned to resonate at one or more frequencies, and convert an input voltage to an output voltage based on resonant current oscillation. The resonant converter 100 enables a PWM operation before short-circuit protection is triggered in order to reduce the amount of overshoot voltage and/or current spikes on the primary side.

The resonant converter 100 includes an oscillator 150 configured to generate a first clock signal to drive a first power switch, and a second clock signal to drive a second power switch during switching operations (e.g. during a normal mode and a PWM mode). The resonant converter 100 includes a short-circuit detector 182 that detects a short-circuit condition in a component 186 of the resonant converter 100. In some examples, the component 186 is a pin of the resonant converter 100. In some examples, the component 186 is an integrated current sense pin. In some examples, the component 186 is a circuit element. In some examples, the component 186 is a circuit element on a primary side of a transformer of the resonant converter 100. In some examples, the component 186 is an integrated current sense circuit. In some examples, the component 186 is a resonant capacitor. The short-circuit detector 182 may detect a short-circuit condition of the component 186 in response to a voltage of the component 186 being equal to or less than a voltage threshold. In some examples, the short-circuit detector 182 may detect a short-circuit condition of an integrated current sense pin (or integrated current sense circuit) in response to the voltage of the integrated current sense signal being equal to or less than the voltage threshold. In some examples, the short-circuit detector 182 includes a voltage comparator that compares the voltage of the component 186 with the voltage threshold, and outputs a PWM control signal in response to the voltage of the component 186 being equal to or less than the voltage threshold.

The resonant converter 100 includes a pulse width modulation (PWM) controller 183 that controls the oscillator in a PWM mode for generating the first clock signal and the second clock signal before short-circuit protection 185 is triggered. For example, in response to the detection of the short-circuit condition in the component 186, the short-circuit detector 182 may send a PWM control signal to the PWM controller 183 to control the oscillator 150 in the PWM mode before the short-circuit protection 185 is triggered. The PWM controller 183 may control the oscillator 150 to reduce a duty cycle of the first clock signal and the second clock signal in the PWM mode before the short-circuit protection 185 is triggered. For example, the oscillator 150 may generate first and second clock signals in a normal mode (e.g., normal switching operations) according to a first frequency and with a first duty cycle, and when the PWM controller 183 controls the oscillator 150 in the PWM mode, the oscillator 150 may generate first and second clock signals according to a second frequency with a second duty cycle. In some examples, the second duty cycle is less than the first duty cycle. In some examples, the second frequency is less than the first frequency.

The resonant converter 100 may include a short-circuit protection trigger 184 that triggers the short-circuit protection 185 after a period of time has elapsed from a start of the PWM mode. In some examples, the short-circuit protection trigger 184 includes a counter that determines (e.g., counts) a time from the start of the PWM mode, and triggers the short-circuit protection 185 after the determined (e.g., counted) time reaches a threshold. In response to the triggering of the short-circuit protection 185, the short-circuit protection 185 may stop the operations of the oscillator 150 from generating the first clock signal and the second clock signal.

The resonant converter 100 can be advantageous over existing solutions because the resonant converter 100 uses PWM operations before the triggering of a short-circuit protection mechanism, which can reduce excessive power transfer to the output and reduce current spikes on the primary side of a transformer of the resonant converter 100 that may occur during a short-circuit condition. For example, conventional solutions may detect a short-circuit condition, and then invoke a short-circuit protection mechanism to stop the switching operations. However, around the time of the short-circuit condition, the conventional resonant converters may produce an overshoot voltage at the voltage output, and current spikes on the primary side. The resonant converter 100 enables a PWM operation before the short-circuit protection is triggered in order to reduce the amount of overshoot voltage and/or current spikes on the primary side.

Figure 1B:
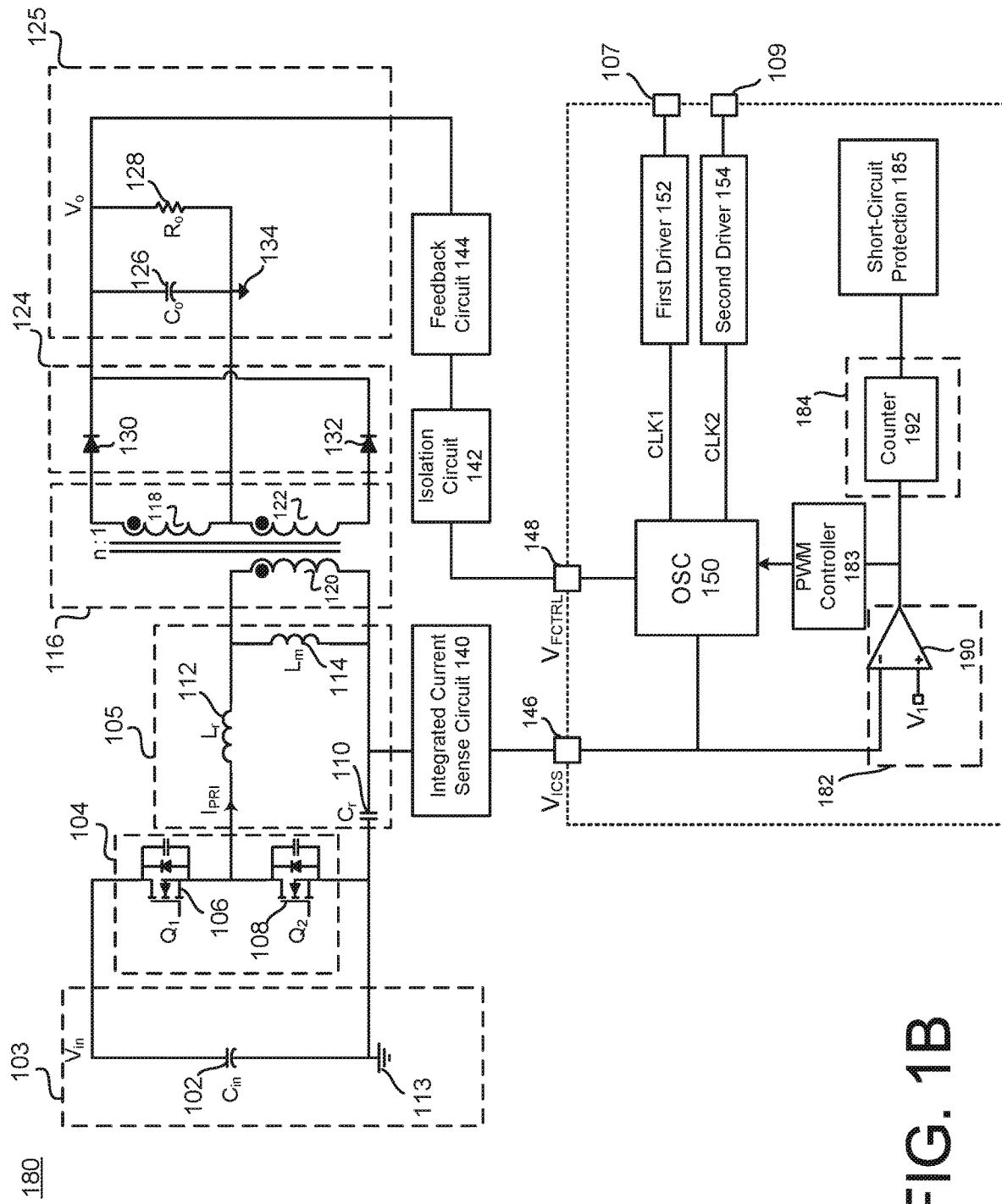
FIG. 1B illustrates a resonant converter for short-circuit protection using pulse width modulation (PWM) according to another implementation.

FIG. 1B illustrates a resonant converter 180 for short-circuit protection using PWM according to another implementation. In some examples, the resonant converter 180 may be an electric power converter that includes a network of one or more inductors and one or more capacitors, which are tuned to resonate at one or more frequencies, and convert an input voltage ($V_{in}$) to an output voltage ($V_o$) based on resonant current oscillation. In some examples, the resonant converter 180 may be a direct current (DC) to DC converter. In some examples, the resonant converter 180 may be a Zero Voltage Switching (ZVS) resonant converter, which turns on at zero voltage, and the output voltage can be controlled by varying the frequency of the switching. In some examples, the resonant converter 180 can be used in a variety of different applications such as Advanced Technology eXtended (ATX) power, server power, audio systems, lighting, game console, computing devices, low to high power applications, and/or soft switching to high frequency switching.

In some examples, the resonant converter 180 is incorporated into an integrated circuit (IC) having a plurality of pins (e.g., a 16 pin or 20 pin arrangement). As shown in FIG. 1B, the pins may include an integrated current sense access pin 146 for access to the integrated current sense signal, a frequency-controlled voltage signal access pin 148 for access to the frequency-controlled voltage signal (VFC-TRL), a first gate access pin 107 for access to the gate of a first power switch 106, a second gate access pin 109 for access to the gate of a second power switch 108. In some examples, the IC having the resonant converter 180 may include other pins such as a ground pin, a power supply pin, line voltage sensing, voltage switching node pin, etc. In some examples, the resonant converter 180 may have other components and circuits such as a resonant capacitor stabilizer as disclosed in U.S. patent application Ser. No. 15/668,974, filed on Aug. 4, 2017, integrated current sense short protection as disclosed in U.S. patent application Ser. No. 15/668,975, filed on Aug. 4, 2017, and/or advanced burst mode control with power estimation as disclosed in U.S. patent application Ser. No. 15/668,983, filed on Aug. 4, 2017, each of which is incorporated by reference in its entirety.

The resonant converter 180 may include an input capacitance circuit 103, a bridge circuit 104, the resonant network 105, a transformer 116, a rectification circuit 124, and an output capacitance circuit 125. Also, the resonant converter 180 may include a feedback circuit 144, an isolation circuit 142, a first driver 152, a second driver 154, and the oscillator 150 (controlled by a frequency-controlled signal ($V_{FCTRL}$)).

The input capacitance circuit 103 may receive an input voltage ($V_{in}$). The input capacitance circuit 103 may include an input capacitor ($C_{in}$) 102 and a ground 113. In some examples, the input capacitor 102 is a polarized capacitor having a negative terminal and a positive terminal. The negative terminal of the input capacitor 102 may be coupled to the ground 113. In some examples, the input capacitance circuit 103 may be a circuit separate from the bridge circuit 104. In some examples, the input capacitance circuit 103 may be part of the bridge circuit 104.

Figure 2:
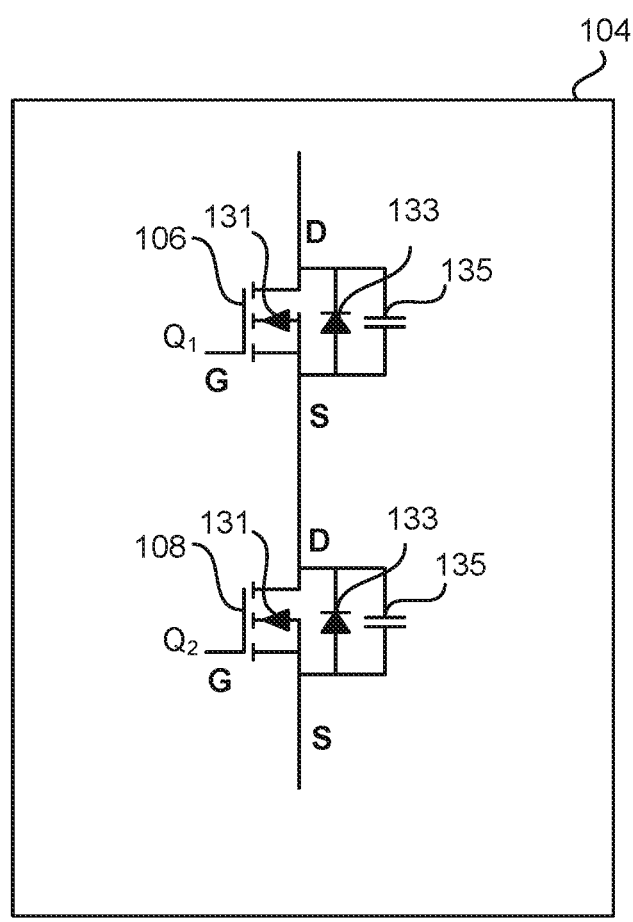
FIG. 2 illustrates an example of a bridge circuit of the resonant converter according to an implementation.

As shown in FIG. 1B, the bridge circuit 104 may be a half-bridge circuit. For example, the bridge circuit 104 may include a pair of power switches including a first power switch 106 and a second power switch 108. In some examples, the first power switch 106 and the second power switch 108 are Metal Oxide Semiconductor Field Effect Transistors (MOSFET) power switches. In some examples, the bridge circuit 104 is a full-bridge circuit having two or more pairs of MOSFET switches. FIG. 2 illustrates an example of the bridge circuit 104 having the first power switch 106 and the second power switch 108 according to an implementation. In some examples, the first power switch 106 and the second power switch 108 may be an N-type MOSFETs. As shown in FIG. 2, each of the first power switch 106 and the second power switch 108 includes a gate (G), a source (S), and a drain (D). Also, each of the first power switch 106 and the second power switch 108 includes an intrinsic body diode 131, an anti-diode 133, and a parasitic output capacitor 135.

Referring back to FIG. 1B, the bridge circuit 104 may generate a square wave voltage by alternatively driving the first power switch 106 and the second power switch 108. In some examples, the bridge circuit 104 is alternatively driven with a 50% duty cycle for each switch. Based on the voltage-controlled signal ($V_{FCTRL}$), the oscillator 150 generates the first clock signal to control the first driver 152, and the second clock signal to control the second driver 154. The first driver 152 is connected to the gate of the first power switch 106, and the second driver 154 is connected to the gate of the second power switch 108.

During normal switching operations, the first driver 152 and the second driver 154 may switch the first power switch 106 and the second power switch 108, respectively, on and off in phase opposition symmetrically, that is, for exactly the same time (or around the same time). This can be referred to as 50% duty cycle operation even if the conduction time of either power switch 106, 108 is slightly shorter than 50% of the switching period. In other words, the first power switch 106 and the second power switch 108 may operate under the condition of equal pulse width (or substantially equal pulse).

In some examples, a dead time (e.g., a small dead time) is inserted between the turn-off of either power switch 106, 108 and the turn-on of the complementary one. This may ensure that the first power switch 106 and the second power switch 108 will not cross-conduct (or substantially not cross-conduct).

Based on the switching of the first power switch 106 and the second power switch 108, the bridge circuit 104 generates a square waveform, which excites the resonant network 105. The resonant network 105 filters the higher harmonic currents of the square waveform generated by the bridge circuit 104. Essentially, only sinusoidal current is allowed to flow through the resonant network 105 even though a square wave voltage is applied to the resonant network 105. As such, the resonant network 105 generates and outputs a resonant sinusoidal waveform that is scaled by the transformer 116 and rectified by the rectification circuit 124, and the output capacitance circuit 125 filters the rectified current and outputs a DC output voltage ($V_o$). The output voltage ($V_o$) may be adjusted by changing the operational frequency of the first power switch 106 and the second power switch 108.

In some examples, the resonant network 105 includes at least three reactive elements. In some examples, the resonant converter 180 is an LLC resonant converter. For example, the resonant network 105 may include a resonant capacitor ($C_r$) 110, a resonant inductor ($L_r$) 112, and a magnetizing inductor ($L_m$) 114. The magnetizing inductor 114 is configured to operate as a shunt inductor. The current may lag the voltage applied to the resonant network 105, which allows the first power switch 106 and the second power switch 108 to be turned on with zero voltage. The transformer 116 includes a primary side winding 120 and one or more secondary side windings such as a first secondary side winding 118 and a second secondary side winding 122. The first secondary side winding 118 and the second secondary side winding 122 are coupled in series. In some examples, the secondary side winding includes only one winding (e.g., either first secondary side winding 118 or second secondary side winding 122). In some examples, the transformer 116 includes multiple windings on the primary side and multiple windings on the secondary side.

The rectification circuit 124 may produce a DC voltage by rectifying AC current. For example, the rectification circuit 124 may rectify the AC current with rectifier diodes such as a first rectification diode 130, and a second rectification diode 132. In some examples, the rectification circuit 124 includes only one rectification diode (e.g., either the first rectification diode 130 or the second rectification diode 132). In some examples, the rectification circuit 124 includes more than two rectification diodes. The anode of the first rectification diode 130 is connected to the positive terminal of the first secondary side winding 118, and the anode of the second rectification diode 132 is connected to the negative terminal of the second secondary side winding 122.

The output capacitance circuit 125 may filter the rectified current and output the DC output voltage ($V_o$). The output capacitance circuit 125 may include an output capacitor ($C_o$) 126, and an output resistor ($R_o$) 128. In some examples, the output capacitor 126 is connected in parallel to the output resistor 128. In some examples, the output capacitance circuit 125 may be a circuit separate from the rectification circuit 124. In some examples, the output capacitance circuit 125 may be part of the rectification circuit 124.

The first rectification diode 130 and the second rectification diode 132 are connected to the output capacitor 126. For example, the cathode of the first rectification diode 130 is connected to the positive terminal of the output capacitor 126, and the cathode of the second rectification diode 132 is also connected to the positive terminal of the output capacitor 126. The negative terminal of the output capacitor 126 is connected to a ground 134.

The feedback circuit 144 may regulate the switching frequency of the resonant converter 180 with a voltage feedback loop by sensing the output voltage. The feedback circuit 144 may be connected to the output capacitance circuit 125 and/or the rectification circuit 124. The isolation circuit 142 is provided on the voltage feedback loop in order to provide isolation required by safety regulations. The isolation circuit 142 may receive a signal from the feedback circuit 144, and then generate the frequency-controlled voltage signal $V_{FCTRL}$ which is supplied to the oscillator 150.

Figure 3:
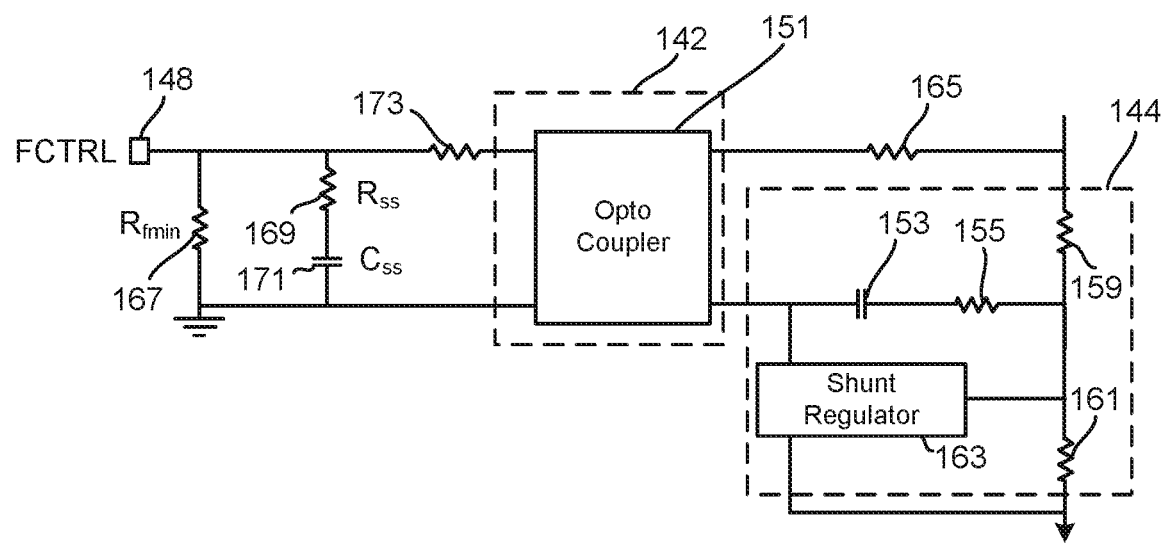
FIG. 3 illustrates an example of a feedback circuit and an isolation circuit of the resonant converter according to an implementation.

FIG. 3 illustrates an example of the feedback circuit 144 and the isolation circuit 142 according to an implementation. In some examples, the feedback circuit 144 includes a shunt regulator 163. In some examples, the feedback circuit 144 includes one or more compensation resistors and one or more compensation capacitors. For example, the feedback circuit 144 may include a capacitor 153, a resistor 155, a resistor 159, and a resistor 161. The isolation circuit 142 may include an opto-coupler 151. The opto-coupler 151 may be coupled to the feedback circuit 144 and the voltage signal access pin 148. Also, in some examples, the resonant converter 180 may include a resistor ($R_{fmin}$) 167, a resistor ($R_{ss}$) 169, a capacitor ($C_{ss}$) 171, a resistor 173, and a resistor 165. The resistor 167 may be coupled to the voltage signal access pin 148, and the resistor 167 may be in parallel with the resistor 169 and the capacitor 171. The resistor 173 may be disposed between the opto-coupler 151 and the voltage signal access pin 148.

Referring back to FIG. 1B, the current $I_{PRI}$ (through the resonant inductor 112) lags the voltage applied to the resonant network 105, which allows the first power switch 106 and the second power switch 108 to be turned on with zero voltage. Referring to FIGS. 1B and 2, the first power switch 106 turns on while the voltage across the first power switch 106 is zero by flowing current through the anti-diode 133 of the first power switch 106. The parasitic output capacitor 135 of the first power switch 106 is discharged before the first power switch 106 is turned on. Similarly, the second power switch 108 turns on while the voltage across the second power switch 108 is zero by flowing current through the anti-diode 133 of second power switch 108. The parasitic output capacitor 135 of the second power switch 108 is discharged before the second power switch 108 is turned on.

Figure 4:
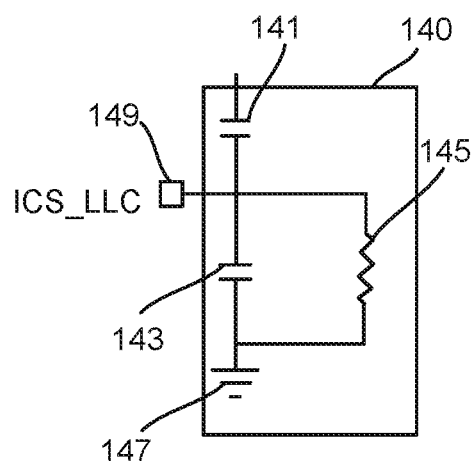
FIG. 4 illustrates an example of an integrated current sense circuit of the resonant converter according to an implementation.

The resonant converter 180 may include an integrated current sense circuit 140. The integrated current sense circuit 140 may be connected to the resonant network 105, and may sense the voltage/current on the primary side of the transformer 116. Also, the integrated current sense circuit 140 may be connected to the integrated current sense voltage access pin 146. FIG. 4 illustrates an example of the integrated current sense circuit 140 according to an implementation. The integrated current sense signal may be the integrated current of the primary side of the transformer 116. In some examples, the integrated current sense circuit 140 senses the integrated current sense signal by a capacitor divider from the voltage of the resonance capacitor 110. The integrated current sense circuit 140 may include a first capacitor 141 and a second capacitor 143. The first capacitor 141 and the second capacitor 143 are configured as a capacitor divider from the voltage of the resonance capacitor 110. The first capacitor 141 may be in series with the second capacitor 143. The integrated current sense circuit 140 may include a resistor 145 in parallel with the second capacitor 143. In some examples, the resonant converter 100 may include an integrated current sense access pin 149 coupled to a point between the first capacitor 141 and the second capacitor, which may receive the integrated current sense signal. In some examples, the integrated current sense access pin 149 and the integrated current sense voltage access pin 146 are the same pin. In some examples, the integrated current sense access pin 149 is a pin different than the integrated current sense voltage access pin 146. The voltage ($V_{ICS}$) of the integrated current sense signal may have a relation with the current ($I_{PRI}$) flowing through the resonance inductor 112. For example, $V_{ICS}$=k*(integral ($I_{PRI}$))−bias voltage. The ratio of the first capacitor 141 and the second capacitor 143 may determine the constant k, and the resistor 145 may remove the voltage offset (or voltage bias) of the voltage of the capacitor divider.

According to the embodiments, as shown in FIG. 1B, the resonant converter 180 includes the short-circuit detector 182, the short-circuit protection trigger 184, and the PWM controller 183. In some examples, the short-circuit detector 182 includes a voltage comparator 190. In some examples, the short-circuit protection trigger 184 includes a counter 192. The voltage comparator 190 may include a negative input terminal, a positive input terminal, and an output terminal. The negative input terminal of the voltage comparator 190 may be connected to the integrated current sense voltage access pin 146. In some examples, the negative input terminal of the voltage comparator 190 may be connected to the integrated current sense circuit 140. The positive input terminal of the voltage comparator 190 may be connected to a reference voltage ($V_1$) (e.g., the voltage threshold). The output terminal of the voltage comparator 190 may be connected to the PWM controller 183. The output terminal of the voltage comparator 190 may be connected to the counter 192. The counter 192 may be connected to the short-circuit protection 185.

The voltage comparator 190 may detect a short-circuit condition on the integrated current sense voltage access pin 146, the integrated current sense access pin 149, the integrated current sense circuit 140, and/or the resonant capacitor 110. In some examples, in response to at least one of the capacitor 141, the capacitor 143, the resistor 145, the resonant capacitor 110 being shorted, the integrated current sense voltage access pin 146, the integrated current sense access pin 149, and/or the integrated current sense circuit 140 becomes shorted, where the voltage ($V_{ICS}$) of the integrated current sense signal becomes zero (or almost zero) and the switching frequency decreases, as further explained with reference to FIG. 5.

Figure 5:
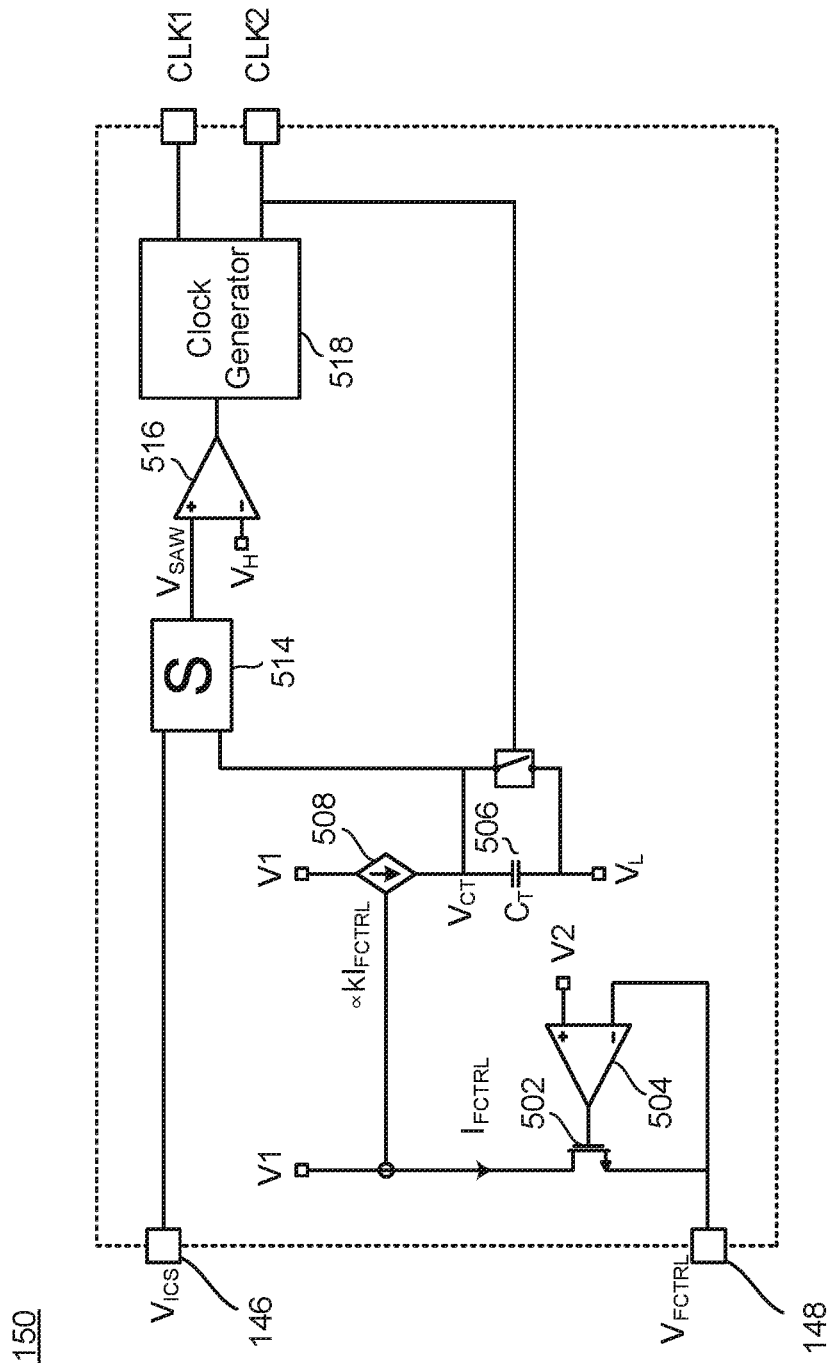
FIG. 5 illustrates an example of an oscillator of the resonant converter according to an implementation.

FIG. 5 illustrates an example of the oscillator 150 according to an implementation. The oscillator 150 may receive the integrated current sense voltage $V_{ICS}$ from the integrated current sense voltage access pin 146, and the voltage-controlled signal $V_{FCTRL}$ from the voltage signal access pin 148, and generate the first clock signal CLK1 and the second clock signal CLK2. The oscillator 150 may include a transistor 502, a voltage comparator 504 (comparing $V_{FCTRL}$ with $V_2$), a current controlled current source 508 that generates current $kI_{FCTRL}$ which is proportional to $I_{FCTRL}$, a timing capacitor ($C_T$) 506, a series voltage summer 514, a voltage comparator 516 (comparing $V_{SAW}$ with $V_H$), and a clock generator 218.

The current $kI_{FCTRL}$ charges timing capacitor $C_T$ 506. The series voltage summer 514 adds the capacitor voltage $V_{CT}$ to the integrated current sense voltage $V_{ICS}$ to generate $V_{SAW}$. Then, the voltage comparator 516 compares $V_{SAW}$ with a threshold voltage $V_H$. The clock generator 518 outputs the first clock signal CLK1 by the increase time of $V_{SAW}$ from $V_L$ to $V_H$ and makes the second clock signal CLK2 have the same time (or substantially the same time) as the first clock signal CLK1. The switching frequency is determined by $V_{ICS}$ and $V_{CT}$. If $V_{ICS}$ becomes zero (or almost zero), the switching frequency is determined by only $V_{CT}$, which causes the switching frequency to decrease instantly (or almost instantly).

This may induce excessive power transfer because the short-circuit protection 185 has a debounce time (e.g., a relatively large debounce time). However, as further explained below, upon the detection of the short-circuit condition, the oscillator 150 operates within a PWM mode before the short-circuit protection 185 is triggered, thereby reducing the otherwise excessive power transfer.

Referring back to FIG. 1B, the voltage comparator 190 may receive the voltage ($V_{ICS}$) of the integrated current sense signal (via its negative input terminal) and receive the voltage threshold ($V_1$) (via its positive input terminal), and compare the voltage ($V_{ICS}$) of the integrated current sense signal with the voltage threshold ($V_1$). In response to the voltage ($V_{ICS}$) of the integrated current sense signal being equal to or less than the voltage threshold ($V_1$) (which indicates that $V_{ICS}$ is relatively low or that the integrated current sense circuit 140 is shorted), the voltage comparator 190 outputs a high signal (which operates a PWM control signal).

In response to the high signal from the output terminal of the voltage comparator 190, the PWM controller 183 controls the oscillator 150 in a PWM mode for generating the first clock signal and the second clock signal before the short-circuit protection 185 is triggered. For example, in response to the detection of the short-circuit condition in the integrated current sense circuit 140 (e.g., when $V_{ICS}$ is less than $V_1$), the PWM controller 183 may send a PWM control signal (output is high at the output terminal of the voltage comparator 190) to the PWM controller 183 to control the oscillator 150 in the PWM mode before the short-circuit protection 185 is triggered. The PWM controller 183 may control the oscillator 150 to reduce a duty cycle of the first clock signal and the second clock signal in the PWM mode before the short-circuit protection 185 is triggered. The PWM controller 183 may prevent excessive power transfer even if the switching frequency decreases.

The counter 192 may receive the PWM control signal, and determine (e.g., count) a time from the start of the PWM mode (e.g., start counting when the output of the voltage comparator is high). When the determined (e.g., counted) time reaches a threshold, the counter 192 may trigger the short-circuit protection 185. In some examples, the threshold is in a range of 10-15 milliseconds. In some examples, the threshold is in a range of 20-30 milliseconds. In response to the triggering of the short-circuit protection 185, the short-circuit protection 185 may stop the operations of the oscillator 150 from generating the first clock signal and the second clock signal.

Figure 6:
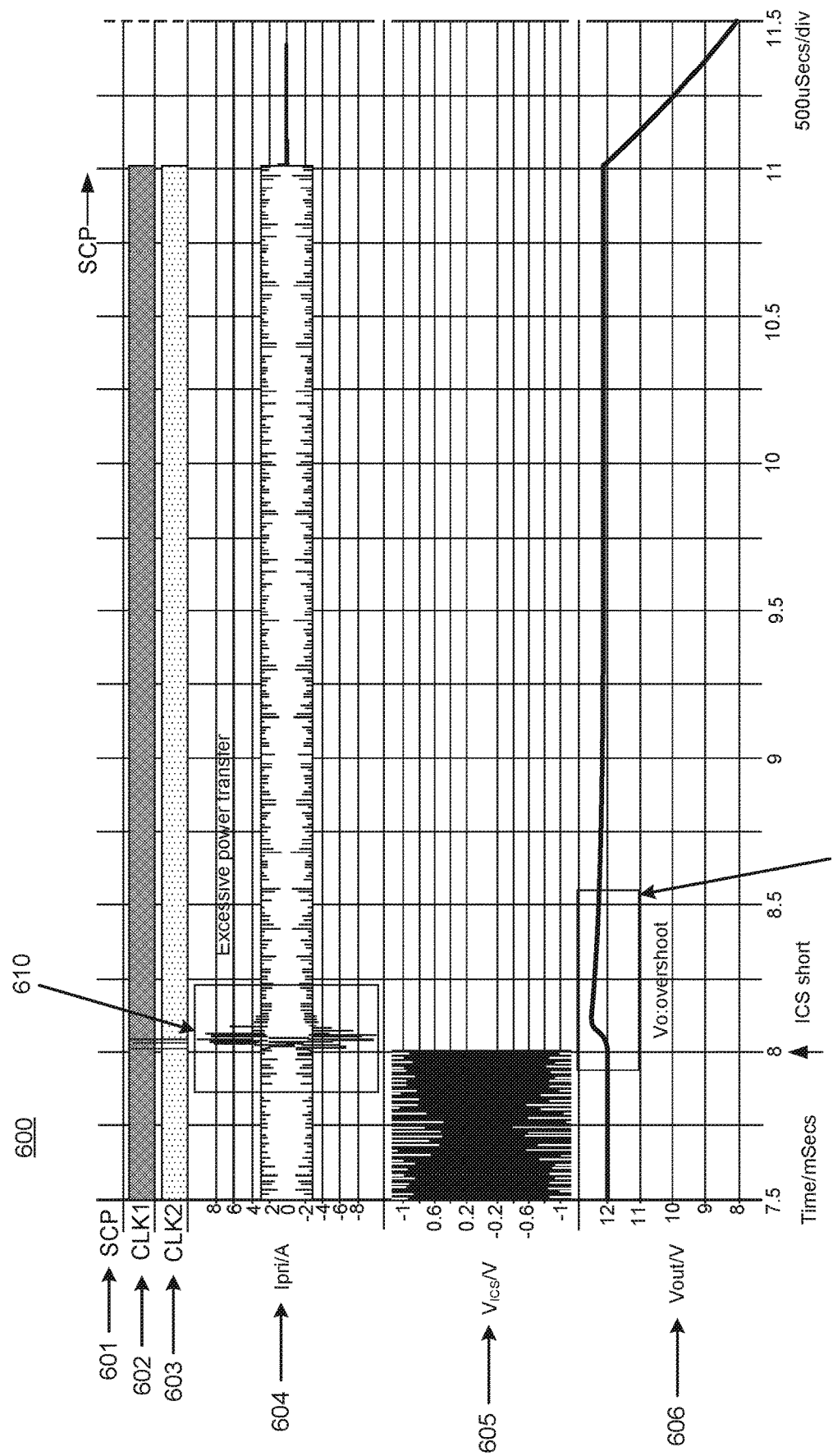
FIG. 6 illustrates example simulation results of a short-circuit condition within a resonant converter without using PWM before short-circuit protection is triggered according to an implementation.

FIG. 6 illustrates example simulation results 600 of a short-circuit condition within a resonant converter without using PWM before short-circuit protection is triggered according to an implementation. For example, the simulation results 600 provide various waveforms of signals in response to a short-circuit condition without using PWM before the short-circuit protection is triggered. The simulation results 600 depict a short-circuit protection (SCP) signal 601 (which transitions to a logic high at 11 milliseconds), the first clock signal 602, the second clock signal 603, the current $I_{PRI}$ signal 604 (through a resonant inductor), the integrated current sense signal $V_{ICS}$ 605, and the output voltage signal 606. As shown in FIG. 6, when an integrated current sense circuit or pin becomes shorted (at 8 milliseconds), a resonant converter without using PWM before the short-circuit protection is triggered may produce excess power transfer in the resonant network at location 610 of the current $I_{PRI}$ signal 604, and an overshoot voltage at location 620 of the output voltage signal 606.

Figure 7:
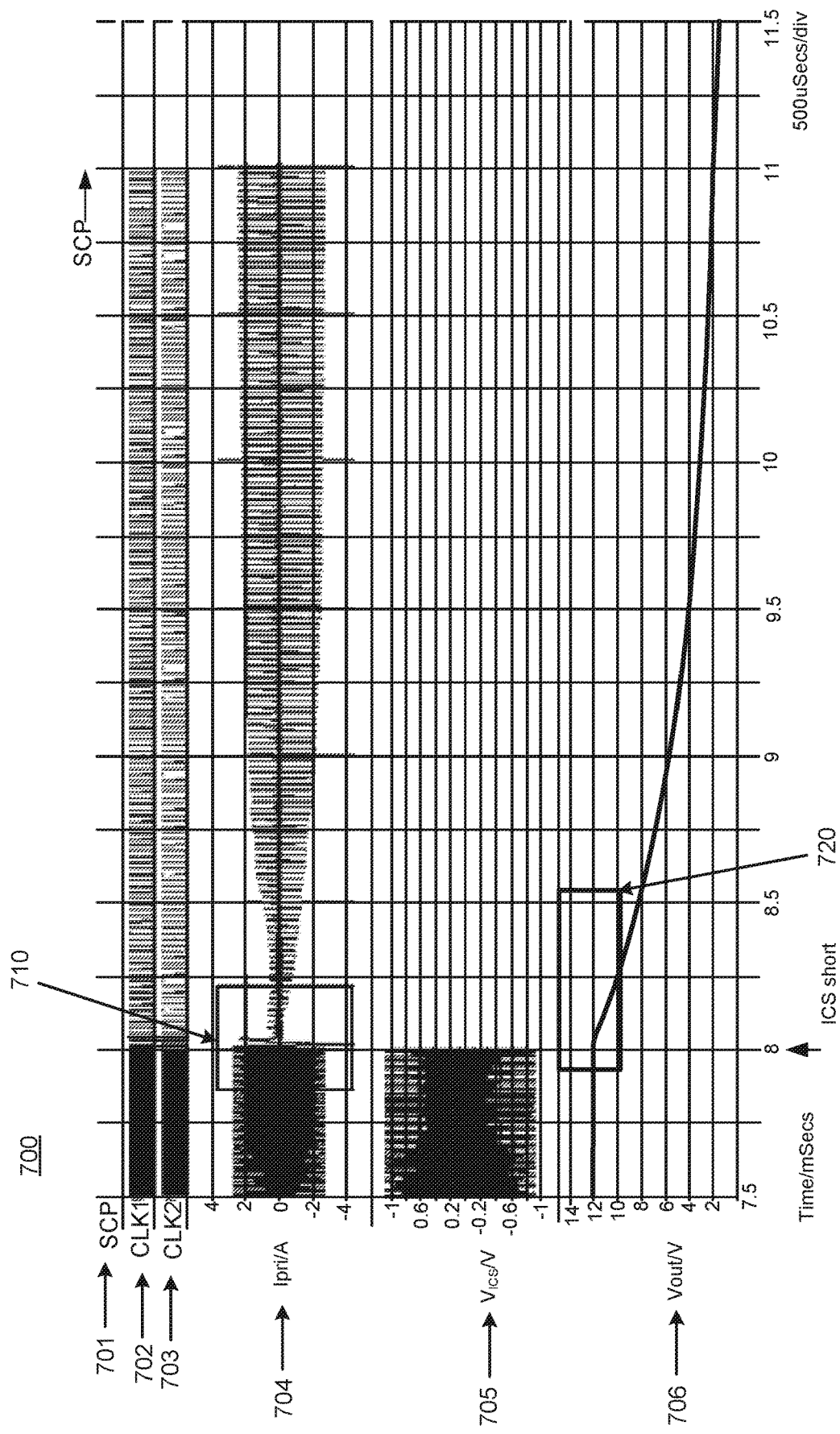
FIG. 7 illustrates example simulation results of a short-circuit condition within the resonant converter using PWM before the short-circuit protection is triggered according to an implementation.

FIG. 7 illustrates example simulation results 700 of a short-circuit condition within the resonant converter 180 using PWM before the short-circuit protection 185 is triggered according to an implementation. For example, the simulation results 700 provide various waveforms of signals in response to a short-circuit condition using PWM before the short-circuit protection 185 is triggered. The simulation results 700 depict a short-circuit protection (SCP) signal 701 (which transitions to a logic high at 11 milliseconds), the first clock signal 702, the second clock signal 703, the current $I_{PRI}$ signal 704 (through the resonant inductor 112), the integrated current sense signal $V_{ICS}$ 705, and the output voltage signal 706. As shown in FIG. 7, when the integrated current sense circuit 140 becomes shorted (at 8 milliseconds), the resonant converter 180 may start a PWM operation (e.g., duty cycle is reduced) before the short-circuit protection 185 is triggered (at 11 milliseconds), which reduces the excess power transfer in the resonant network at location 710 of the current $I_{PRI}$ signal 704, and reduces an overshoot voltage at location 720 of the output voltage signal 706.

According to an implementation, a resonant converter for short-circuit protection includes an oscillator, a short-circuit detector configured to detect a short-circuit condition in a component of the resonant converter, and a pulse width modulation (PWM) controller configured to control the oscillator in a PWM mode before short-circuit protection is triggered. The oscillator, when in the PWM mode, is configured to generate a first clock signal for driving a first power switch and a second clock signal for driving a second power switch.

In some implementations, the resonant converter may include one or more of the following features (or any combination thereof). The component may be a pin of the resonant converter. The component may be an integrated current sense pin. The component may be a circuit element on a primary side of a transformer of the resonant converter. The short-circuit detector may be configured to determine that a voltage of the component is equal to or less than a voltage threshold, and the PWM controller is configured to control the oscillator in the PWM mode before the short-circuit protection is triggered. The short-circuit detector may include a voltage comparator configured to compare a voltage of the component with a voltage threshold, and output a PWM control signal to the PWM controller in response to the voltage of the component being equal to or less than the voltage threshold. The resonant converter may include a short-circuit protection trigger configured to trigger the short-circuit protection after a period of time has elapsed from a start of the PWM mode. The short-circuit protection trigger may include a counter configured to count a time from the start of the PWM mode, and trigger the short-circuit protection after the counted time reaches a threshold. The PWM controller, au be configured to control the oscillator to reduce a duty cycle of the first clock signal and the second clock signal when in the PWM mode and before the short-circuit protection is triggered. In response to the short-circuit protection being triggered, the short-circuit protection may be configured to stop operations of the oscillator.

According to an implementation, a resonant converter for short-circuit protection include an oscillator, a short-circuit detector configured to detect a short-circuit condition in an integrated current sense circuit connected to a resonant network of the resonant converter, and a pulse width modulation (PWM) controller configured to control the oscillator in a PWM mode before short-circuit protection is triggered. The oscillator, when in the PWM mode, is configured to generate a first clock signal for driving a first power switch and a second clock signal for driving a second power switch.

In some implementations, the resonant converter may include one or more of the above/below features (or any combination thereof). The short-circuit detector may include a voltage comparator configured to compare a voltage of an integrated current sense signal sensed by the integrated current sense circuit with a voltage threshold, and output a PWM control signal to the PWM controller in response to the voltage of the integrated current sense signal being equal to or less than the voltage threshold. The integrated current sense circuit may include a first capacitor, a second capacitor, and a resistor, and the short-circuit detector is configured to detect the short-circuit condition in the integrated current sense circuit in response to at least one of the first capacitor, the second capacitor, and the resistor being shorted. The resonant converter may include a short-circuit protection trigger configured to trigger the short-circuit protection after a period of time has elapsed from a start of the PWM mode. The short-circuit protection trigger may include a counter configured to count a time from the start of the PWM mode, and trigger the short-circuit protection after the counted time reaches a threshold. The PWM controller may be configured to control the oscillator to reduce a duty cycle of the first clock signal and the second clock signal when in the PWM mode and before the short-circuit protection is triggered.

According to an implementation, a resonant converter for short-circuit protection includes an oscillator, a voltage comparator configured to compare a voltage of an integrated current sense signal with a voltage threshold, and a pulse width modulation (PWM) controller configured to control the oscillator in a PWM mode in response to the voltage of the integrated current sense signal being equal to or below the voltage threshold. The PWM controller is configured to control the oscillator in the PWM mode before short-circuit protection is triggered. The oscillator, when in the PWM mode, is configured to generate a first clock signal for driving a first power switch and a second clock signal for driving a second power switch.

In some implementations, the resonant converter may include one or more of the above/below features (or any combination thereof). The resonant converter may include a counter configured to trigger the short-circuit protection. The resonant converter may include an integrated current sense circuit connected to a resonant capacitor of a resonant network of the resonant converter, and the integrated current sense circuit configured to sense the integrated current sense signal using a voltage of the resonant capacitor. The voltage comparator may be configured to receive the integrated current sense signal from the integrated current sense circuit. The PWM controller may be configured to control the oscillator to reduce a duty cycle of the first clock signal and the second clock signal when in the PWM mode and before the short-circuit protection is triggered.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments. It should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. A resonant converter for short-circuit protection, the resonant converter, comprising:
    an oscillator;
    a short-circuit detector configured to detect a short-circuit condition in a component of the resonant converter; and
    a pulse width modulation (PWM) controller configured to control the oscillator in a PWM mode before short-circuit protection is triggered, the oscillator, when in the PWM mode, configured to generate a first clock signal for driving a first power switch and a second clock signal for driving a second power switch.

2. The resonant converter of claim 1, wherein the component is a pin of the resonant converter.

3. The resonant converter of claim 1, wherein the component is an integrated current sense pin.

4. The resonant converter of claim 1, wherein the component is a circuit element on a primary side of a transformer of the resonant converter.

5. The resonant converter of claim 1, wherein the short-circuit detector is configured to determine that a voltage of the component is equal to or less than a voltage threshold, and the PWM controller is configured to control the oscillator in the PWM mode before the short-circuit protection is triggered.

6. The resonant converter of claim 1, wherein the short-circuit detector includes a voltage comparator configured to compare a voltage of the component with a voltage threshold, and output a PWM control signal to the PWM controller in response to the voltage of the component being equal to or less than the voltage threshold.

7. The resonant converter of claim 1, further comprising:
    a short-circuit protection trigger configured to trigger the short-circuit protection after a period of time has elapsed from a start of the PWM mode.

8. The resonant converter of claim 7, wherein the short-circuit protection trigger includes a counter configured to count a time from the start of the PWM mode, and trigger the short-circuit protection after the counted time reaches a threshold.

9. The resonant converter of claim 1, wherein the PWM controller is configured to control the oscillator to reduce a duty cycle of the first clock signal and the second clock signal when in the PWM mode and before the short-circuit protection is triggered.

10. The resonant converter of claim 1, wherein, in response to the short-circuit protection being triggered, the short-circuit protection is configured to stop operations of the oscillator.

11. A resonant converter for short-circuit protection, the resonant converter, comprising:
    an oscillator;
    a short-circuit detector configured to detect a short-circuit condition in an integrated current sense circuit connected to a resonant network of the resonant converter; and
    a pulse width modulation (PWM) controller configured to control the oscillator in a PWM mode before short-circuit protection is triggered, the oscillator, when in the PWM mode, configured to generate a first clock signal for driving a first power switch and a second clock signal for driving a second power switch.

12. The resonant converter of claim 11, wherein the short-circuit detector includes a voltage comparator configured to compare a voltage of an integrated current sense signal sensed by the integrated current sense circuit with a voltage threshold, and output a PWM control signal to the PWM controller in response to the voltage of the integrated current sense signal being equal to or less than the voltage threshold.

13. The resonant converter of claim 11, wherein the integrated current sense circuit includes a first capacitor, a second capacitor, and a resistor, and the short-circuit detector is configured to detect the short-circuit condition in the integrated current sense circuit in response to at least one of the first capacitor, the second capacitor, and the resistor being shorted.

14. The resonant converter of claim 11, further comprising:
    a short-circuit protection trigger configured to trigger the short-circuit protection after a period of time has elapsed from a start of the PWM mode.

15. The resonant converter of claim 14, wherein the short-circuit protection trigger includes a counter configured to count a time from the start of the PWM mode, and trigger the short-circuit protection after the counted time reaches a threshold.

16. The resonant converter of claim 11, wherein the PWM controller is configured to control the oscillator to reduce a duty cycle of the first clock signal and the second clock signal when in the PWM mode and before the short-circuit protection is triggered.

17. A resonant converter for short-circuit protection, the resonant converter, comprising:
    an oscillator;
    a voltage comparator configured to compare a voltage of an integrated current sense signal with a voltage threshold;
    a pulse width modulation (PWM) controller configured to control the oscillator in a PWM mode in response to the voltage of the integrated current sense signal being equal to or below the voltage threshold, the PWM controller configured to control the oscillator in the PWM mode before short-circuit protection is triggered, the oscillator, when in the PWM mode, configured to generate a first clock signal for driving a first power switch and a second clock signal for driving a second power switch.

18. The resonant converter of claim 17, further comprising:
    a counter configured to trigger the short-circuit protection.

19. The resonant converter of claim 17, further comprising:
    an integrated current sense circuit connected to a resonant capacitor of a resonant network of the resonant converter, the integrated current sense circuit configured to sense the integrated current sense signal using a voltage of the resonant capacitor, wherein the voltage comparator is configured to receive the integrated current sense signal from the integrated current sense circuit.

20. The resonant converter of claim 17, wherein the PWM controller is configured to control the oscillator to reduce a duty cycle of the first clock signal and the second clock signal when in the PWM mode and before the short-circuit protection is triggered.

\* \* \* \* \*